(12) United States Patent
Zhu et al.

(10) Patent No.: US 12,210,516 B1
(45) Date of Patent: Jan. 28, 2025

(54) MULTIMODAL SEARCH AND REFINEMENT

(71) Applicant: Amazon Technologies, Inc., Reno, NV (US)

(72) Inventors: Xinliang Zhu, Santa Clara, CA (US); Arnab Dhua, Cupertino, CA (US); Son D. Tran, Mountain View, CA (US); Douglas Ryan Gray, Portola Valley, CA (US)

(73) Assignee: Amazon Technologies, Inc., Reno, NV (US)

( * ) Notice: Subject to any disclaimer, the term of this patent is extended or adjusted under 35 U.S.C. 154(b) by 146 days.

(21) Appl. No.: 17/854,791

(22) Filed: Jun. 30, 2022

(51) Int. Cl.
*G06F 16/242* (2019.01)
*G06F 16/2457* (2019.01)

(52) U.S. Cl.
CPC .... *G06F 16/2425* (2019.01); *G06F 16/24578* (2019.01)

(58) Field of Classification Search
CPC ...................... G06F 16/2425; G06F 16/24578
See application file for complete search history.

(56) References Cited

U.S. PATENT DOCUMENTS

2021/0064665 A1* 3/2021 Zhao ................ G06F 16/90328

* cited by examiner

*Primary Examiner* — Truong V Vo
(74) *Attorney, Agent, or Firm* — Hogan Lovells US LLP

(57) ABSTRACT

Combined feature vectors may be generated to map features of two or more search queries to a common embedding space. A user may provide an initial input query and then provide a refinement query. Independent feature vectors may be generated for each of the initial input query and the refinement query, may be weighted, and then may be combined to form a combined feature vector. The combined feature vector aligns different search modalities within the common embedding space that may be executed against an index.

20 Claims, 14 Drawing Sheets

MULTIMODAL SEARCH AND REFINEMENT

BACKGROUND

Users are increasingly utilizing electronic devices to research, locate, and obtain various types of information. For example, users may utilize a search engine to locate information about various items, such as items offered through an electronic marketplace. Users may present an initial query to a search engine and then evaluate the results that are returned. If the user is unsatisfied, then additional refinements may be presented. However, it is often challenging for a user to verbally describe or otherwise explain what they are searching for. Providing images may provide additional guidance to a search engine, but often there are too many visual structures within the images to accurately extract sufficient information to improve search results.

BRIEF DESCRIPTION OF THE DRAWINGS

Various embodiments in accordance with the present disclosure will be described with reference to the drawings, in which.

DETAILED DESCRIPTION

Approaches in accordance with various embodiments overcome the aforementioned problems with existing technologies by providing multimodal search capabilities that enable refinement of an initial search query with additional information. Various embodiments may use different modalities for the initial search query and refinements, such as an image for the initial search query and then textual or auditory refinements. In at least one embodiment, each of the search inputs may be processed through a trained machine learning system to generate independent feature vectors. These feature vectors are then combined to generate a combined feature vector (e.g., shared feature vector), which may be mapped within a shared representation space. This combined feature vector may then be processed against an index to generate a set of results responsive to the initial search query and refinements.

Various embodiments address and overcome problems associated with refinements to an initial search query. For example, the user may present a first search query using a first modality, such as an image. Using an image search may lead to a mixture of results because the search may be based on particular extracted features, which may be applicable to a variety of different categories or product domains. The user may become frustrated by the results and stop using the system. Moreover, attempts to refine or reformulate the search may lead to removal of the original results and presentation of a new search. However, embodiments of the present disclosure may enable refinements that use one or more additional modalities, such as adding textual or auditory information to refine the initial search query. These different search modalities may then be processed by a training machined learning system, which may align different representations (e.g., text and image, text and audio, image and image, etc.) within a common embedding space. As a result, the trained system may establish a correspondence between matching visual and language concepts, thereby providing an improved result to the search query.

Figure 1:
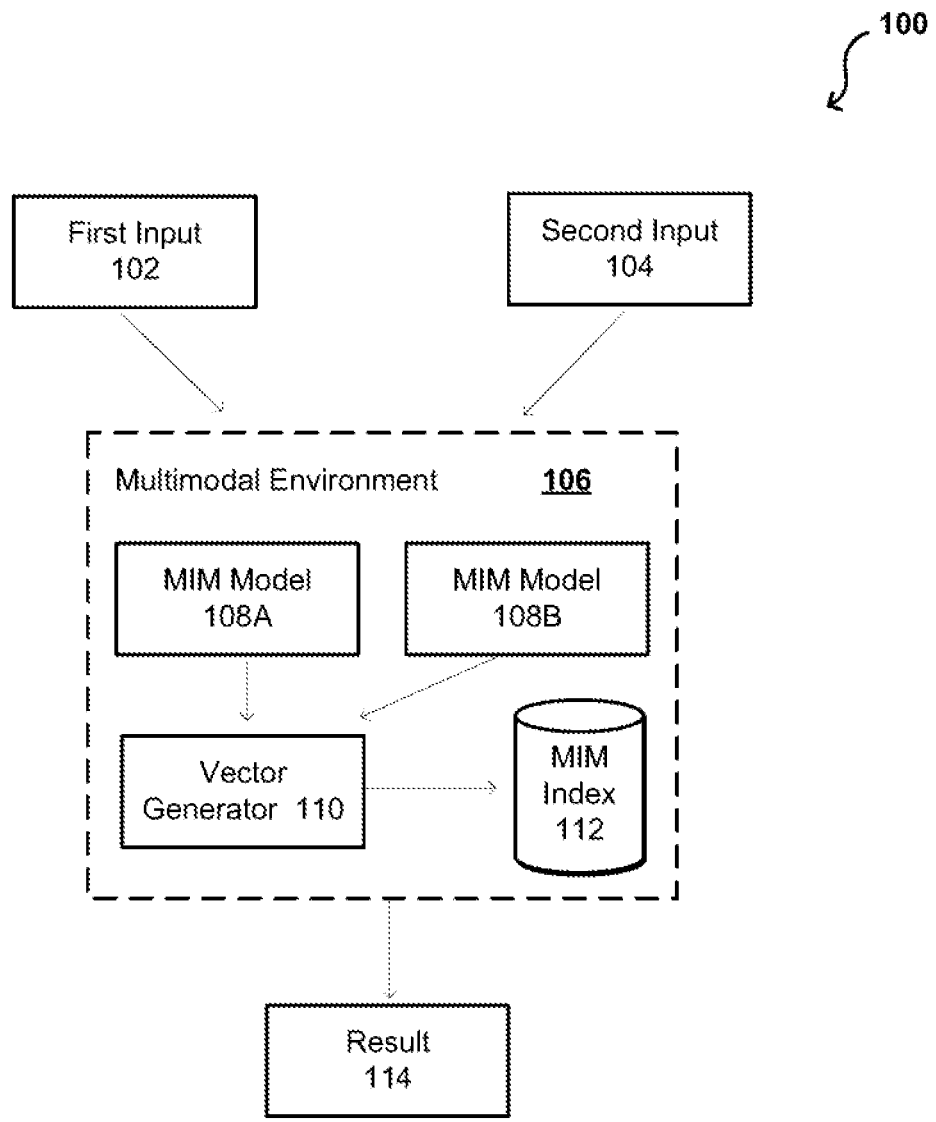
FIG. 1 illustrates components of an environment in which aspects of various embodiments can be implemented.

FIG. 1 illustrates components of an example computing environment 100 that can be used to implement aspects of the various embodiments. In this example, inputs are shown as a a first input 102 (which in this example may correspond to an image input) and a second input 104 (which in this example may correspond to a text input). It should be appreciated that "first" and "second" are used to label the inputs and not to identify the order in which they are used or processed by the system, as the first input may be provided first or the second input may be provided first. The inputs may be provided over one or more computer networks, for example using a client device (e.g., user device), as will be described herein. The client device can be any appropriate computing device capable of generating such inputs, as may include a smartphone, desktop, set-top box (e.g., Fire TV), voice-enabled device (e.g., Echo), or tablet computer. The inputs may include a textual input (e.g., a search string typed in by a user), an audio input (which may be converted to a textual input using one or more natural language processing systems or may be processed as an auditory input), an image input, a video input, or a combination thereof, such as text-based input with an accompanying audio or image sample. The inputs 102, 104 may be provided at different times. For example, the first input 102 may be provided first and then later the second input 104 may be provided, for example to refine or otherwise supplement the first input 102. Additionally, as noted above, the second input 104 may be provided first and then later the first input 102 may be provided, for example to refine or otherwise supplement the second input 104. In this example, the inputs may comprise a request for content about one or more products or services that are offered by an entity, such as a retailer or selling partner offering products side-by-side in online stores. It should be understood that a retailer is just one example of such an entity, however, as there may be providers of various other types of content that could take advantage of aspects of the various embodiments as well, as would be understood to one of ordinary skill in the art in light of the teachings and suggestions contained herein. By way of example only, the customer may be part of a subscription service that provides push notifications or information responsive to the user's selections. Accordingly, various embodiments may be directed toward locating information responsive to the user selections.

As noted, a user may provide inputs that are utilized with a search environment, such as a search system for an online store that has indexed various products available through the online store. The user may provide the first input 102 at a first time to a search environment. For example, the search environment may include a search service that executes one or more search strategies against a search index, which may include one or more indexes of products available from a provider. For example, with an online marketplace, the search index may include one or more indexes. The first input 102 may be used for searching, but may not provide satisfactory results for the user. For example, when searching with the first input 102, image matching may be used in example where the first input 102 is an image. As a result, the visual search is matched to an appearance of one or more objects within the search index. First, visual features of the first input 102 may be computed, for example using a deep embedding model. Similarly, features of objects are executed and placed within the search index. Matching is then carried out based on, for example, a nearest neighbor search to find items within the search index that are closed to the first input 102. While these models may be useful for exactly matching certain visual structures, often high-level semantic relationships are missed, which may lead to irrelevant results. For example, these matching algorithms may match dominant features within the image, which may not be the main object in the image. Additionally, the image inputs may be different from associated catalog images and may not include each of the features of the associated item with enough clarity to identify certain features. Attempted improvements to these models often lead to larger, most processing tensive systems that still fail to provide sufficiently accurate results.

Embodiments of the present disclosure may use two or more inputs to provide improved results by processing the inputs through a trained machine learning model that uses a multimodal system. For example, in the illustrated embodiment, the first input 102 may be provided for an initial evaluation against a search index. The results, however, may be underwhelming, and thereafter the second input 104 may be used to refine or otherwise improve the results. Both the first input 102 and the second input 104 are provided to a multimodal environment 106, which may include one or more trained machine learning systems that aligns both image and text representations (among other representations) within a common embedding space, as will be described herein. In this example, each of the first input 102 and the second input 104 are evaluated using a trained multimodal image matching model (MIM) 108. While two separate models 108A, 108B are shown in this embodiment, it should be appreciated that a common model may be used, or additional models may be used. Each of the inputs 102, 104 may be processed by the trained models 108A, 108B and output a respective feature vector, such as an image feature vector for the image input 102 or a text input vector 104 for the text input. As will be appreciated, other feature vectors may also be generated for different types of inputs. These output feature vectors may then be processed by a vector generator 110 (e.g., combiner, combined vector generator), which may apply weights, which may not be equal, to the input feature vectors and generate a combined vector.

Additionally, it should be appreciated that a weighted combination is provided as one example of forming a combined feature vector, but other methods may also be used. For example, one or more trained machine learning systems may be used to receive, as input, two feature vectors and then determine factors to combine the two feature vectors into a combined vector. Additionally, other processes may also be used to apply one or more rules or guidelines for combining two or more vectors into a single vector. This combined vector may be representative of one or more features of both the first image 102 and the second text 104. The combined feature vector may then be evaluated against a MIM index 112, which may have various items associated with a certain environment pre-mapped and indexed. As noted, the items within the MIM index 112 may be mapped to a common vector space, and as a result, the combined vector, which includes components of both the first input 102 and the second input 104, may provide an improved result 114 responsive to an initial input query.

Embodiments of the present disclosure may be utilized to refine or improve results provided from an initial input query. An initial input query may be a request to a provider or environment to search through an index of available products, services, links, or the like. The initial input query may be of a first modality, such as an image input, a text input, an auditory input, a video input, or a combination thereof. Furthermore, the initial input query may be of a first modality and converted to a different modality. By way of example, an auditory input may be evaluated using one or more natural language processors and then converted to a textual input. As another example, an image input that includes text may be split or otherwise segmented into an image input and a textual input, where the text is extracted from the image. As yet another example, a video input may be segmented into one or more frames and used as one or more image inputs and/or the audio track of the video input is received and converted into a textual input.

One or more trained MIM models may be used to generate vector representations of inputs, which may be referred to as feature vectors. The feature vectors may all be associated with a shared space representation where both text and image representations (among other options, such as audio and image representations) are aligned within a common embedding space so that matching can be carried out interchangeably across modalities. For example, during training, the MIM models may be trained using images that include an associated label, such as an image and a title that would appear within an e-commerce environment. Training may be performed simultaneously or substantially simultaneously. Additionally, in embodiments, training may be performed separately, for example on a number of different models, and then an alignment model may be used to align different results within a common vector space.

Various embodiments of the present disclosure may also permit adjustments to weights between different feature vectors generated for different inputs. That is, the combined feature vector may be a combination of two or more feature vectors generated using inputs with two or more different modalities. A first weight may be applied to a first feature vector while a second weight is applied to a second feature vector. These weights may be adjusted based on a variety of inputs. For example, a user may be permitted to adjust the weights. In other embodiments, weights may be adjusted based on an evaluation of returned results. In various other embodiments, weights may be based, at least in part, on a category associated with the inputs, where information may be collected to learn how different weighting impacts results.

In this manner, the system may allow for dynamic changes in weighting to provide improved results. Additionally, as noted above, one or more machine learning systems may be used to combine the first and second feature vectors.

Figure 2:
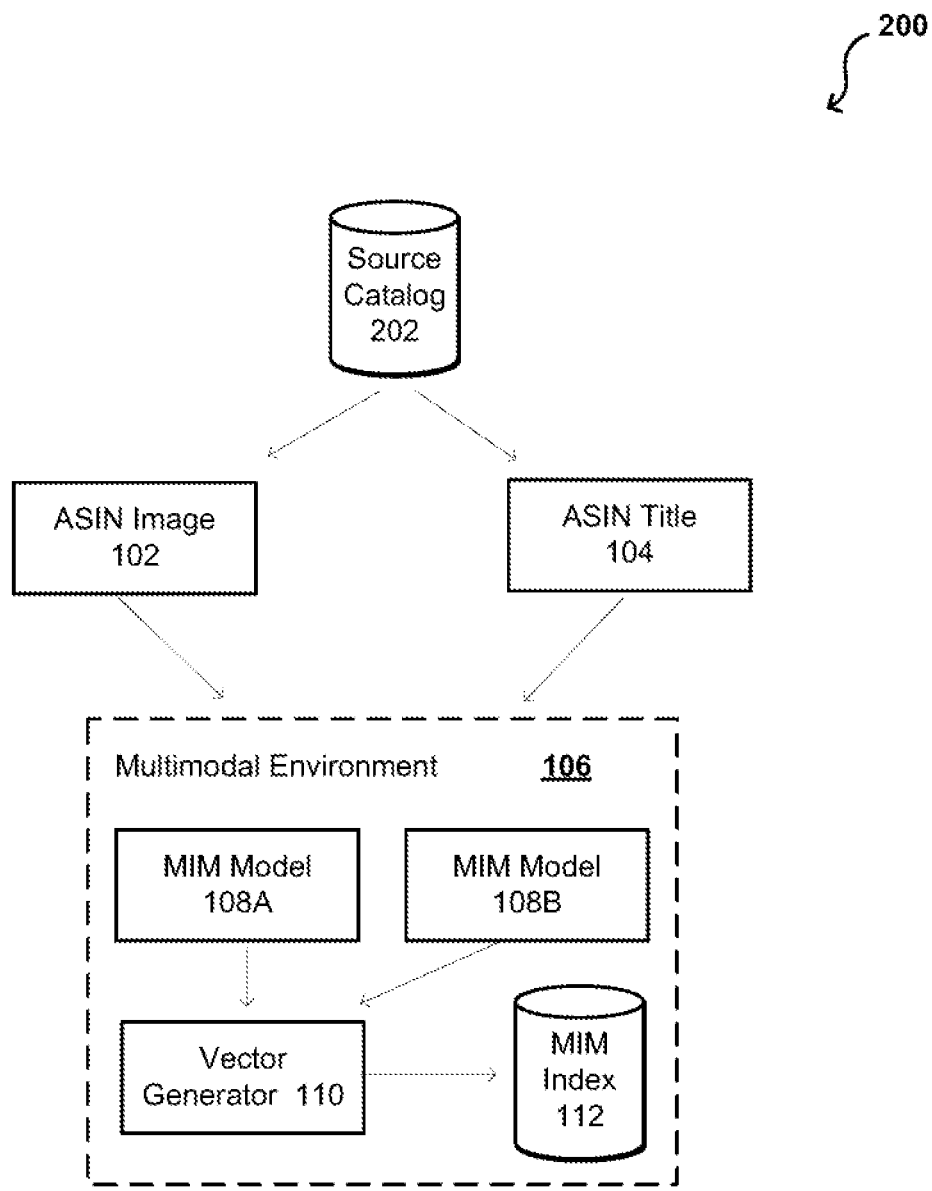
FIG. 2 illustrates components of an environment in which aspects of various embodiments can be implemented.

FIG. 2 illustrates an example computing environment 200 that can be used to implement aspects of the various embodiments. In this example, the MIM index 112 is populated for a source catalog 202, which may include, among other items, one or more products available for sale in an online marketplace. However, it should be appreciated that such a source catalog 202 is provided by way of example only and that embodiments may be utilized for other areas where a user may wish to search through a catalog, including but not limited to, online search results, service offerings, and the like. With an example of a product catalog, the source catalog 202 may include items that are associated with different feature pairs, such as <image, title> where a given image is associated with a title. For example, a catalog product may include an image of an item and a title for how the item will appear. Additionally, other information may also be used, such as one or more phrases within a description of the item, tags applied to the item, and the like. This information may then be evaluated using the multimodal environment 106, which includes the trained MIM models 108A, 108B. As noted above, more or fewer trained models may be used.

Information within the source catalog 202 is segmented into an image portion 204 and a text portion 206 in this example. In certain embodiments, the image and text portions are associated with products within a catalog, which may be represented by Amazon Standard Identification Numbers (ASINs) as one example. The ASIN may be associated with a unique alphanumeric identifier, which may be approximately 10-characters, but could be more or less. The image portion 204 may correspond to one or more images associated with an item while the text portion 206 is associated with a textual title assigned to the item. It should be appreciated that certain products may include multiple images and such a process may associate or otherwise group multiple images with a single title in different training steps. Additionally, titles may include multiple words, and as a result, entire phrases, or portions of phrases, may represent one text portion 206. Additionally, multiple text portions may be used for the different portions of phrases of a given title.

Both the image portion 204 and the text portion 206 are provided to the multimodal environment 106 and the MIM models 108A, 108B may be used to generate a respective feature vector for each of the image portion 204 and the text portion 206. These feature vectors may then be combined into a combined vector within the vector generator 110. For example, the individual vectors may be weighted and combined. In various embodiments, the weights are equal when populating the MIM index 112. However, it should be appreciated that given weights may be adjusted based, at least in part, on different categories of information, historical data, or the like. For example, it may be determined that certain categories provide improved results when the image portion is weighted more than the text portion. As a result, for items within that category, the weights may be adjusted. Additionally, other methods or systems may also be incorporated to generate the combined vector and the example of using different weights is provided as one non-limiting option. Accordingly, the source catalog 202 may be processed to populate the MIM index 112 with different combined feature vectors for given items within the source catalog 202. It should be appreciated that this process may be performed offline or semi-offline (e.g., in the background) so that the MIM index 112 will be prepared for execution when a search request is received.

Figure 3:
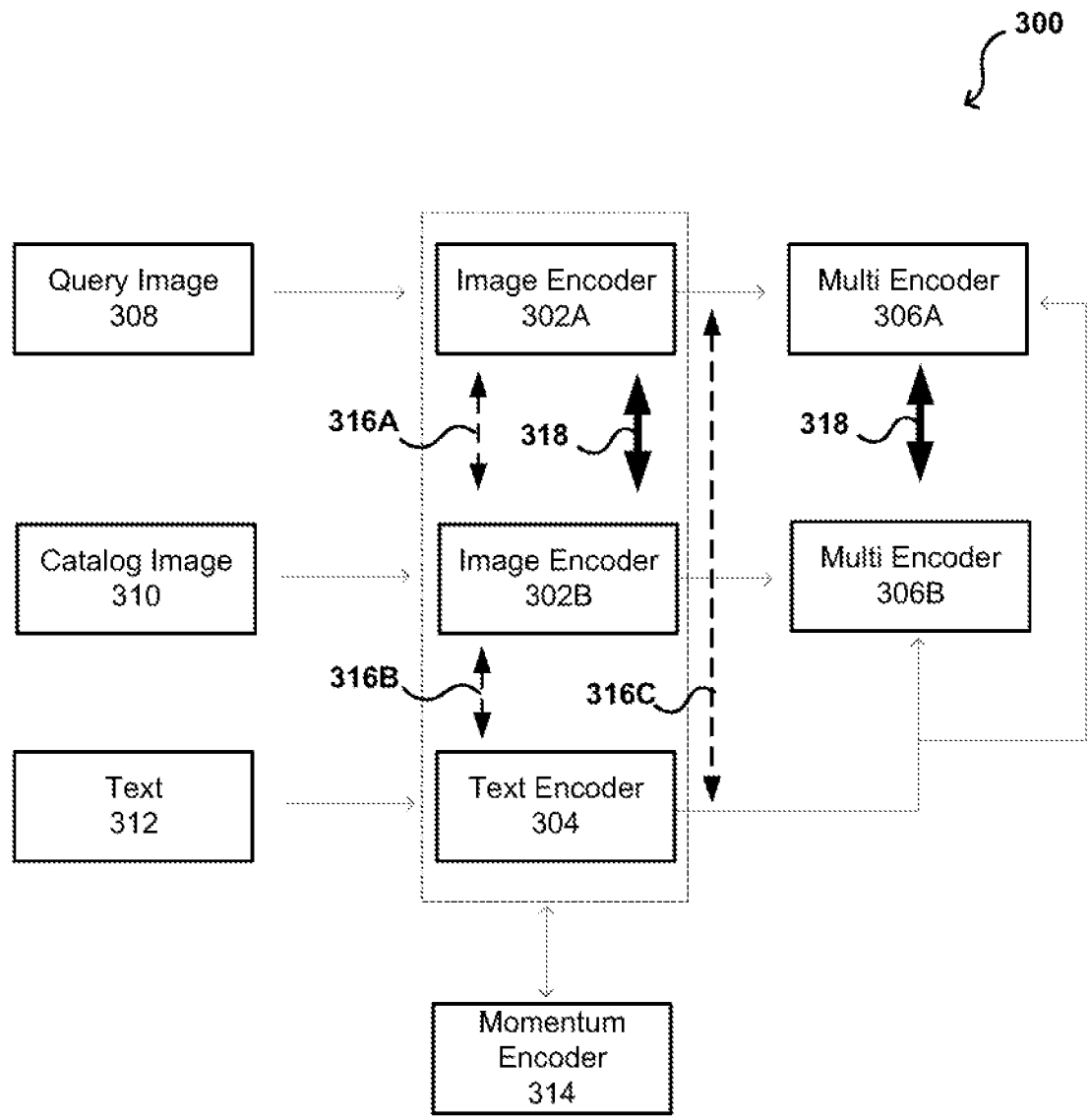
FIG. 3 illustrates components of an environment in which aspects of various embodiments can be implemented.

FIG. 3 illustrates components of an example multimodal architecture 300 that can be used to implement aspects of the various embodiments. For example, the illustrated architecture 300 may form at least a portion of the multimodal environment 106 and/or the MIM models 108. This example shows a series of encoders that includes two separate image encoders 302A, 302B and a text encoder 304. The encoders 302A, 302B, 304 provide outputs to multimodal encoders 306A, 306B. In various embodiments, one or more of these encoders 302A, 302B, 304, 306A, 306B may be BERT based encoders. The illustrated embodiment includes, as inputs to the different encoders, a query image 308, a catalog image 310, and text 312. As noted above, these inputs are provided by way of example and, in various embodiments, different inputs and associated encoders may be used, such as auditory or video inputs, among other options. The query image 308 may refer to an "in the wild" image, such as a photograph or video taken by a user for a search. As will be appreciated, searching with in the wild images is often challenging due to the different potential angles, backgrounds, lighting, and the like. In contrast, the catalog image 310 may be an image taken professionally with a standard background and certain lighting to highlight or otherwise ensure different features are seen. As a result, while the query image 308 and the catalog image 310 may be of substantially a same object, they may be processed or otherwise evaluated differently due to the differences between how the images are obtained and presented. In various embodiments, the text 312 may be catalog text associated with the catalog image 310, such as a title of an ASIN, as noted above. Further illustrated in this example is a momentum encoder 314, which may be used for self-supervised training with a contrastive loss.

It should be appreciated that the momentum encoder 314 may be omitted in various embodiments. In this example, the momentum encoder 314 may provide information to and/or receive information from each of the encoders 302A, 302B, 304 and/or also to, or alternatively to, the multimodal encoders 306A, 306B. For example, momentum updates and distillation may be utilized by the momentum encoders for different contrastive losses 316 between the encoders 302A, 302B, 304. It should be appreciated that momentum is provided as one example for training and that other processes may be used in addition to, or in place of, momentum. Additionally, in this example, weights 318 are shared between the image encoders 302A, 302B and the multimodal encoders 306A, 308B.

Embodiments may utilize one or more features of an align before fuse (ALBEF) model, however as shown, four new losses are used to align the query image 308 and the catalog image 310, the query image 308 and the text 312, the query image 308 and the text 312, and the catalog image 310 and the text 312. The input images 308, 310 and the text 312 are encoded into sequences of embeddings before processing via the multimodal encoders 306A, 306B. Embodiments align the images 308, 310 and image and text pairs (e.g., image 308 with text 312 and image 310 with text 312) with the contrastive losses 316A, 316B, 316C. The image features and text features may then be fused via cross attention layers in the multimodal encoders 306A, 306B.

Various embodiments provide training processes that include image-image contrastive learning (IIC) on the image-encoders 302A, 30B, image-text contrastive learning (ITC) on the image and text encoders 302A, 302B, 304, image-text matching (ITM), and masked language modeling (MLM) on the multimodal encoders 306A, 306B. In at least one embodiment, IIC is associated with a deep metric learning to train an image embedding model. Furthermore, one or more training processes may be considered as pre-training processes. In this example, IIC matches query images and catalog images, as shown in FIG. 3. Different optimizations may be used to provide high similarity scores between query-catalog image pairs. Contrastive losses may be computed and then summed to train the model.

Figure 4:
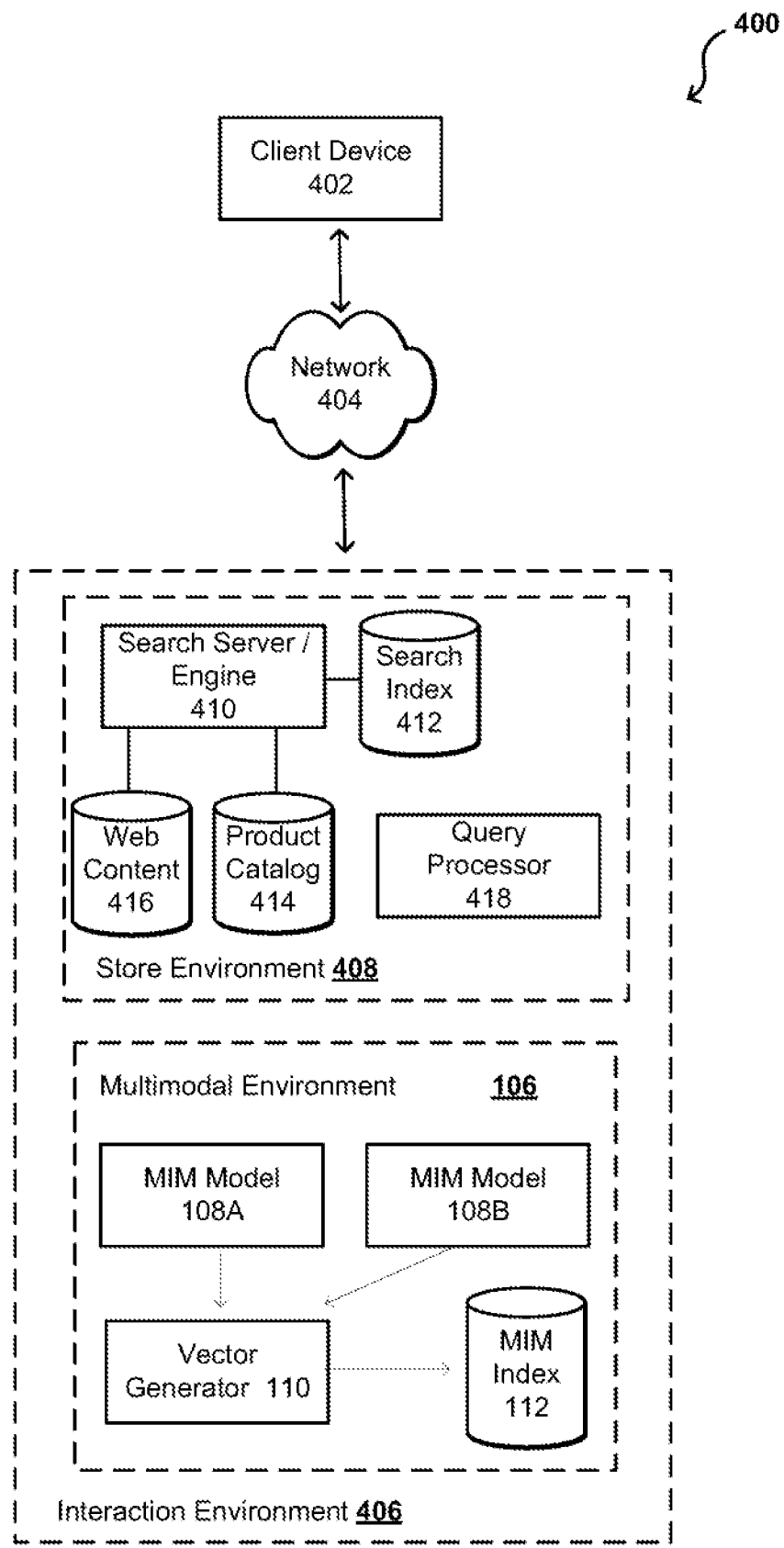
FIG. 4 illustrates components of an environment in which aspects of various embodiments can be implemented.

FIG. 4 illustrates components of an example computing environment 400 that can be used to implement aspects of the various embodiments. In this example, a user is able to utilize a client device 402 to submit requests for content across one or more networks 404, such as the Internet or a cellular network. As noted above, the client device can be any appropriate computing device capable of generating such a request. The request may also include a textual request, an audio request, an image request, a video request, or a combination thereof, such as text-based request with an accompanying audio or image sample. Additionally, the request may include multiple requests, where a first request may be an initial query and a second request may be a refinement of the initial query.

In this example, the request may be directed to an address associated with an interaction environment 406, or a set of hardware and software resources utilized by a provider to provide electronic content, at least some of which may relate to products and/or services offered by the provider. An interaction environment in some embodiments includes a collection of network-accessible services executed on computer hardware that provide multiple channels (e.g., mobile app., voice-based search, web access, physical presence, etc.) through which customers (using a client computing device) can access various catalogs stored in databases to find various products and services available to purchase, lease, etc., sometimes in the form of detail pages. Although a single interaction environment is illustrated, it should be understood that there may be multiple provider or store environments accessible over the at least one network 404. The products and/or services may be offered for varying types of consumption, such as purchase, rent, lease, download, stream, and the like. Additionally, the interaction environment may also be directed toward a content presentation environment that provides, responsive to the user request, content such as articles, videos, audio clips, images, and the like. Furthermore, the interaction environment 406 may include access to an e-commerce storefront to search and order items for physical delivery to the user.

In this example, an initial request is routed to a store environment 408 associated with the interaction environment 406. For example, the store environment 408 may be part of an ecosystem of a provider that includes an e-commerce environment for the user to search and order different items. The request may be received at a server, such as a web server, which can direct the request, or information such as keywords from the request, to a search server 410, search engine, or other such device, service, process, or component that is able to execute the query (or query terms) against a search index 412 corresponding to products or services offered by the provider. In at least one embodiment, one or more language models may be utilized to weight the search server/engine 410 to influence the results returned from the query. The results can be used to provide relevant information (e.g., title and description) for products and services that are determined to be at least somewhat relevant to the search query. The relevant information can be pulled from a product catalog 414, for example, and combined with web content from a web content repository 416 or other such location, in order to provide a webpage with search results to return to the client device 402 for display. Any of a number of different approaches to determining results from executing one or more search terms against a search index can be utilized within the scope of various embodiments.

In various embodiments, a query processor 418 may be utilized to process or otherwise modify one or more portions of the input query provided by the user device 402. For example, the query processor 418 may crop or otherwise prepare an input image for evaluation. Additionally, image data may be processed using one or more computer vision systems to identify and classify items within the image. Moreover, the query processor may take a textual input and either prepare the entire input as an input, extract portions of the textual input, or the like. Furthermore, the query processor 418 may include, or may be in communication with, one or more natural language processing (NLP) systems. For example, audio may be converted to text. Additional processing systems may also be used for video context. Additionally, video data may use a combination of computer vision techniques, text based techniques (e.g., from captioning or text in the video), and audio techniques (e.g., NPL for dialog).

As mentioned, however, the accuracy of the search, or relevance of the search results, will depend in large part upon the quality of the search index 412 that is utilized and/or the models used by the search sever 410. For example, in at least one embodiment, the request is an initial search request that uses a first modality, such as an image search. The image search may compare certain features of the image against related features within the index 412 to provide the results. However, the user may evaluate the results and determine they are insufficient and wish to provide additional information to further refine or improve the search. This additional information may be provided in the form of a secondary or follow up request, which may be routed toward the search server/engine 410 and/or toward the multimodal environment 106 for further evaluation. The multimodal environment 106 may then take information from the first request and the second request for processing via the trained MIM models 108A, 108B to generate individual feature vectors, as noted above. These feature vectors may then be combined at the vector generator 110 to generate a combined feature vector that is processed against the MIM index 112, which may be an index of the search index 412, product catalog 414, and/or web content 416 that is generated in accordance with the process described in FIG. 2. Accordingly, subsequent search results provided back to the user device 402 may include results that incorporate both of the search queries evaluated against the MIM index 112. As noted above, these results may be improvements over the initial results of the search engine 410 by generating of the combined vector that is evaluated over the shared space that includes features of both an item image and text.

Figure 5:
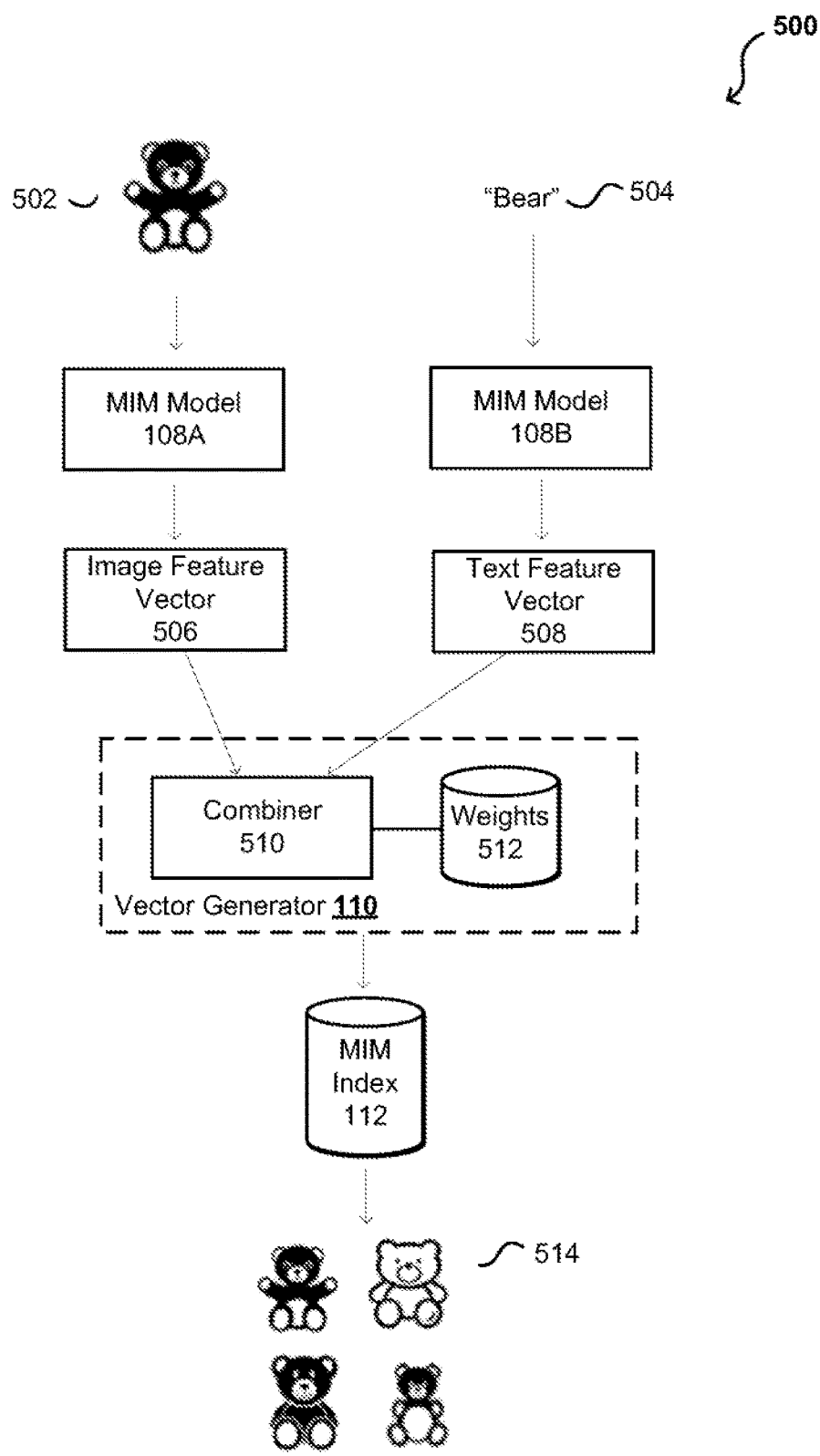
FIG. 5 illustrates an example flow for a multimodal search in accordance with various embodiments.

FIG. 5 illustrates an example search environment 500 that uses a multimodal input to provide search results. In this example, an initial query 502 corresponds to an image, shown as a teddy bear. Processing the search with just the initial query 502 may lead to unsatisfactory results. For example, one or more features of the initial query 502 may include ears, a snout, paws, fur, etc. While these features are indicative of bears, they may also be associated with other animals, such as dogs. As a result, a set of search results with only the initial query 502 may lead to a mixture of relevant and irrelevant results, which may frustrate a user. Embodiments of the present disclosure provide for a refinement or additional query 504, which in this example is a textual input. The textual input in this example is "bear" presented as a search string in order to try and limit results to not only the features of a bear, but to specifically include bears. As noted above, various embodiments may include additional or alternative inputs. For example, "bear" may be spoken and then converted to the string "bear." These inputs 502, 504 may then be provided to the MIM models 108A, 108B, as noted above, to generate respective image and text feature vectors 506, 508. The respective feature vectors 506, 508 are then provided to the vector generator 110 to be combined 510 according to one or more weights 512. For example, the weights 512 may be predetermined based, at least in part, on a category of the search. In other examples, the weights 512 may be adjusted dynamically by a user. It should be appreciated that weights 512 may be updated and adjusted over time, for example as information regarding search accuracy is collected. As previously noted, the use of weights 512 with the vector generator 110 is provided by way of example and is not intended to limit the scope of the present disclosure. For example, the weights 512 may correspond to neural network information and the combiner may be a trained network that receives the input vectors 506, 508 to produce a combined feature vector output. Furthermore, it should be appreciated that while the example only shows two inputs, there may be more inputs and the weights may be distributed across three, four, five, or any reasonable number of inputs. The combiner 510 may be used to sum or otherwise combine the vectors 506, 508 in accordance with their weights. But, in various other embodiments, a negative weight may be applied to remove one or more features. For example, the user may have provided a search term such as "-teeth" or "no teeth" or "without teeth" so that the bears provided were not showing their teeth. Accordingly, portions of vectors associated with teeth may be removed or otherwise provided a negative weight in order to keep such items out of the search results.

The combined vector is then processed against the MIM index 112, which may be pre-generated offline, and leads to search result 514. As shown, these results include a number of stuffed bears, which the user may browse through for selection to purchase, among other options.

Embodiments of the present disclosure may provide the user options to provide additional information to refine existing search results. The existing results may not be removed or otherwise replaced with the new search query. Instead, the added information is used to supplement the existing search by providing more data to execute against the index. As shown, the additional data changes the vector used to process the index, thereby changing the output. The changes to the vector may be adjusted or tuned based, at least in part, on historical search information, user inputs, or the like. For example, one or more search systems may determine that one or more portions of the input are more relevant than another and adjust the weighting accordingly. The determination may be based on information such as a category of the additional information. For example, if a user provides an input image of a shirt and then provides text such as "pattern" the system may determine that the pattern of the shirt is the most relevant feature, and not features of the shirt such as short sleeves, long sleeves, collared, etc. In this manner, the weights may be adjusted to improve the search vector and generate improved, tuned search results.

Various embodiments may be used to refine initial search results using one or more additional inputs. However, it should be appreciated embodiments may also be used to present an initial set of search results based on two or more inputs having different modalities. For example, an initial query may include both an image and text. Additionally, in at least one embodiment, an initial query may include a single input that has multiple modalities, such as an image that includes text, among other options. Furthermore, the input may not be presented as the same input modality. That is, an auditory input may be converted to text, a video may be converted to an image, and the like. Additionally, in embodiments, an input may be used as a single embedding, even if the input has multiple parts. For example, a text input such as "brown bear" may be represented as a single input. However, in other embodiments, a text input such as "brown bear" may be broken up into two different text inputs of "brown" and "bear" and then each of those inputs may be weighted to modify or change a vector.

Embodiments may also provide suggestions for further refinements. For example, a user may provide an initial image for a search. Then, if the user decides to refine the search, the system may provide suggestions for further refinements. It should be appreciated that these suggestions may be based on previous search results, popular search results, historical information for the user, or the like. For example, the user may provide an input image for Vitamin-C by providing a picture of a bottle. To refine the search, the system may provide suggestions such as "Vitamin-C capsules" or "Vitamin-C 300 grams" or "Brand A Vitamin-C." The user may then select one of these options to be used as the refinement input for processing via one or more trained models to generate a combined feature vector. Additionally, the user may also select one or more features for removal from a search. For example, the same search for "Vitamin-C" may be provided with a drop menu of different options that the user can de-select from the search results. This de-selection may be provided as an input with a negative weight to modify the combined feature vector.

Figure 6A:
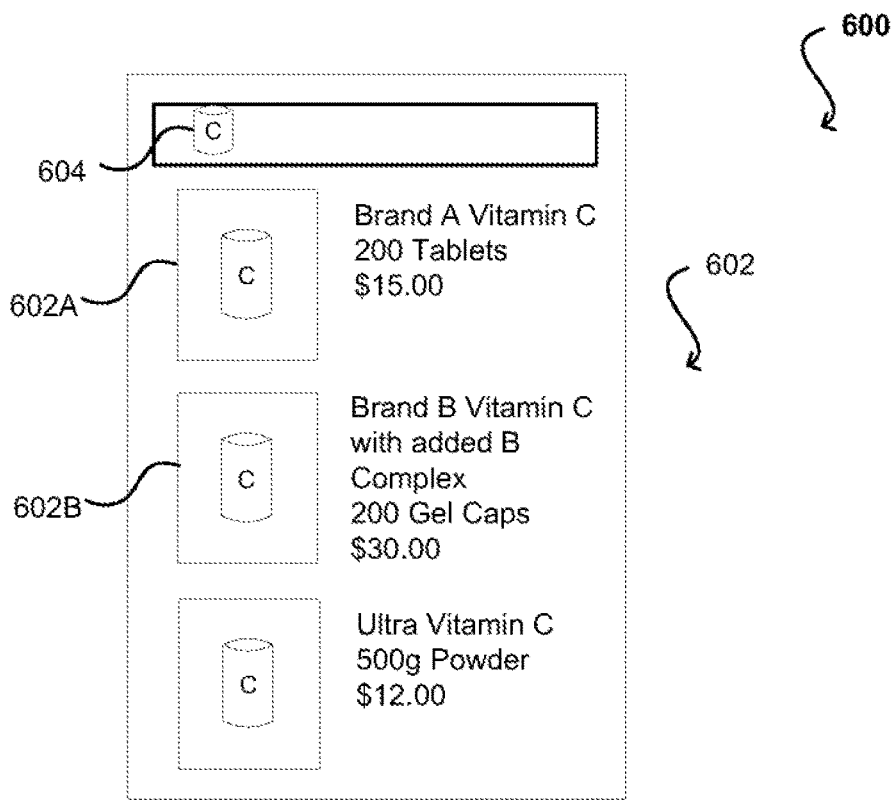
FIG. 6A illustrates an example interface of search results in accordance with various embodiments.

FIG. 6A illustrates an example environment 600 providing a set of search results 602 responsive to an input query 604. In this example, the input query 604 is an image provided within a search bar 606 associated with an e-commerce environment. For example, a user may take a photo of a bottle, in this case a Vitamin-C bottle. The image is then processed and the search results 602 include different examples of items for purchase responsive to the input query 604. For example, in this case, a first result 602A is for "Brand A" Vitamin C tablets while a second result 602B is for "Brand B" gel caps.

Figure 6B:
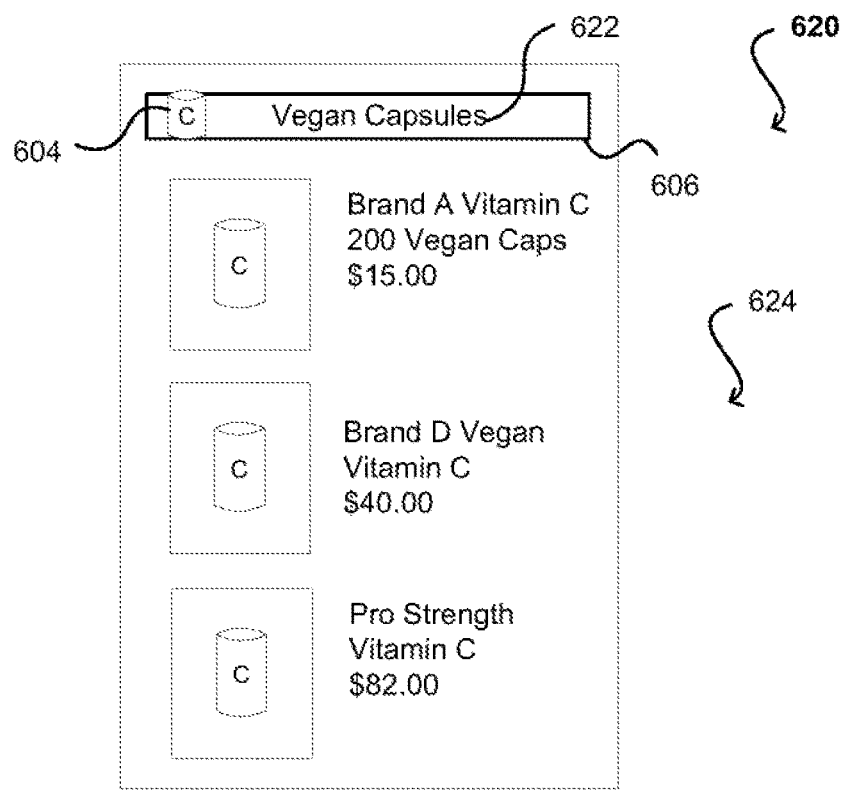
FIG. 6B illustrates an example interface of refined search result in accordance with various embodiments.

FIG. 6B illustrates an example environment 620 where the search results 602 are refined by a second input query 622. In this example, search results 624 are updated compared with FIG. 6A to show new items based on the second input query 622. For example, the second input query may be used to develop a second query vector that may be combined with a vector associated with the first query, as described above. The weighting for the different vectors may vary, as noted, based on one or more factors. As a result, the updated search results 624 are provided to the user that emphasize the request for vegan capsules. This second input query 622 may be provided as a search string that the user types into the search bar 606, may be extracted from an auditory input provided by the user, or the like.

Figure 6C:
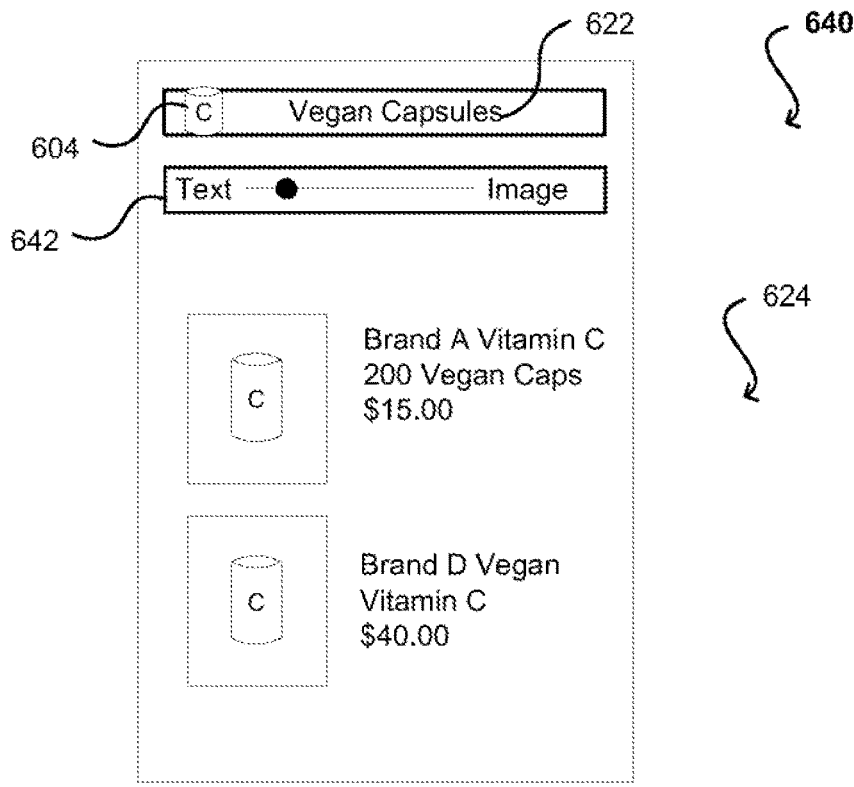
FIG. 6C illustrates an example interface of refined search result in accordance with various embodiments.

FIG. 6C illustrates an example environment 640 in which the updated search results 624 are shown based on the initial input 604 and the second input 622. In this example, a weight adjustment input 642 is provided in the form of a slider. The user may then adjust a weight applied to each of the inputs. In FIG. 6C, it can be seen that a greater emphasis is being placed on the text (e.g., the second input 622) than the image (e.g., the first input 604). It should be appreciated that the slider is provided by way of example only and that other embodiments may include other tools for permitting the user to adjust weights, such as entering in a numerical value for the weights, among other options.

Figure 6D:
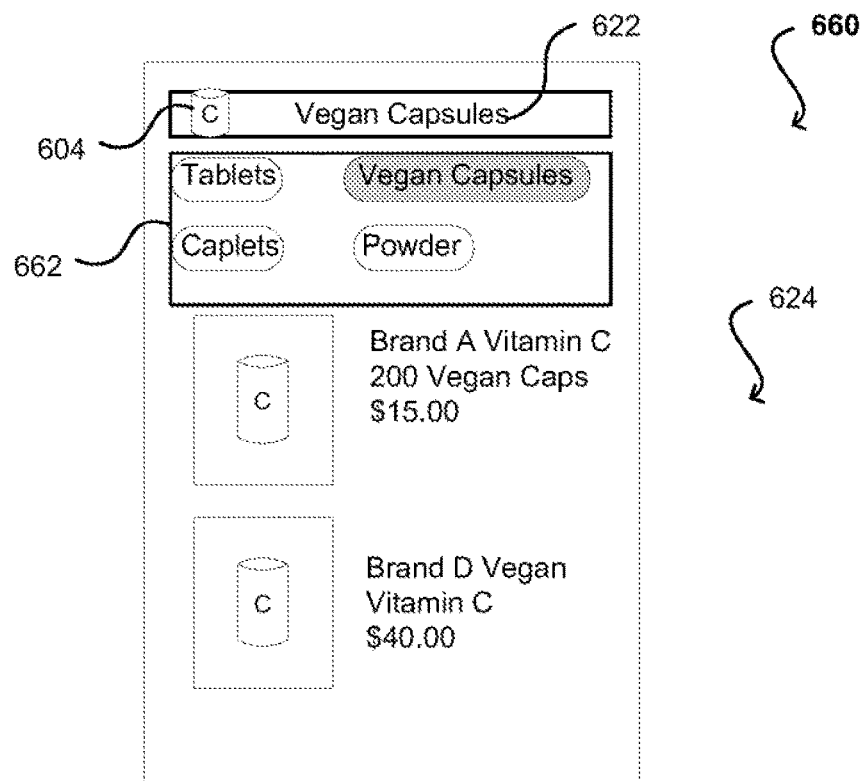
FIG. 6D illustrates an example interface of refined search result in accordance with various embodiments.

FIG. 6D illustrates an example environment 660 in which the second input 622 is presented as a series of selectable elements 662. In this example, rather than having the user type in the second input 622, the user may select one of a number of popular inputs or recommended inputs. In this case, the user has selected the "Vegan Capsules" option, as shown by the shading, and therefore the updated search results 624 are provided based on that selection.

Figure 6E:
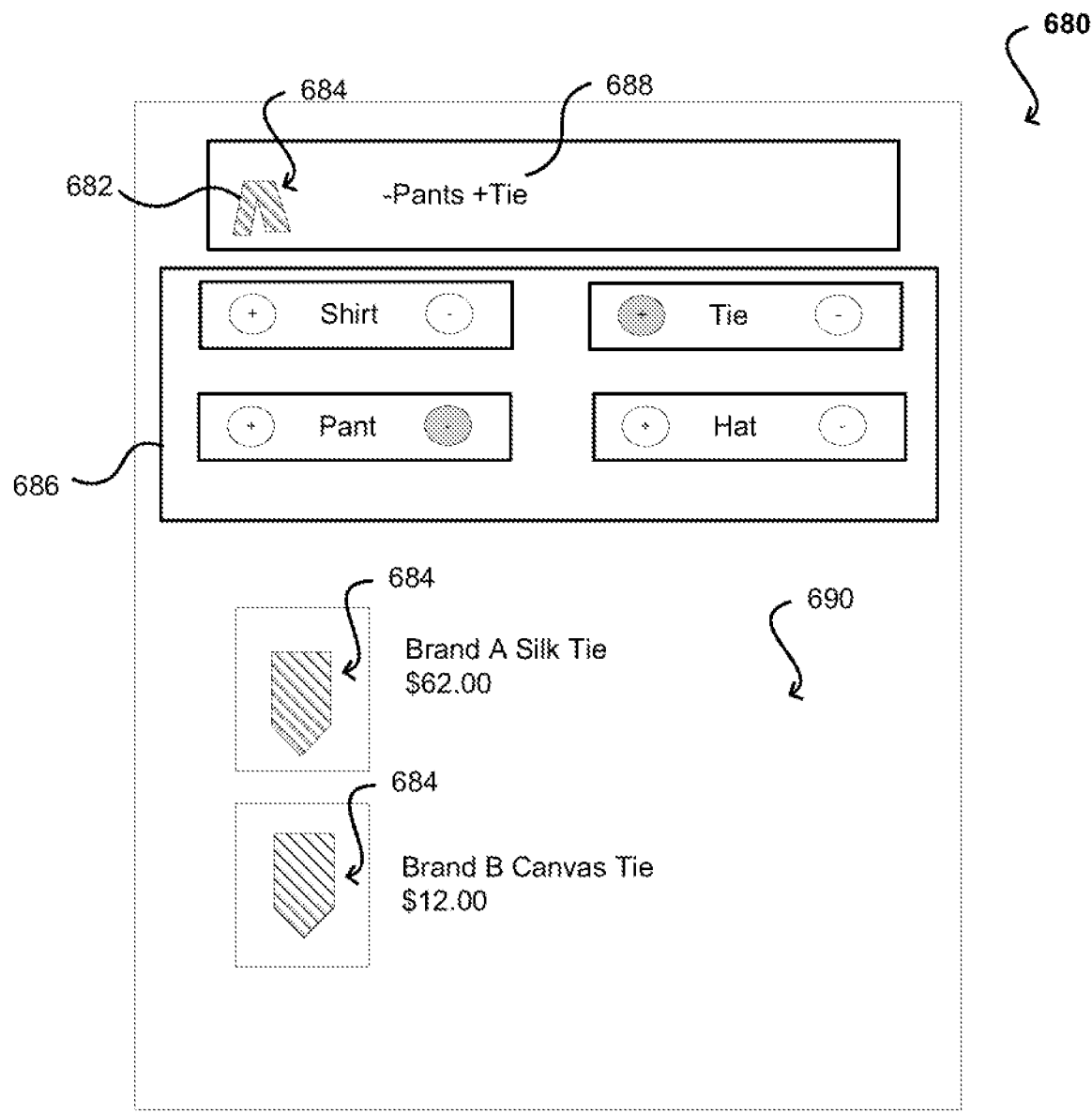
FIG. 6E illustrates an example interface of refined search result in accordance with various embodiments.

FIG. 6E illustrates an example environment 680 in which an initial input 682 is provided as an image, in this case a picture of a pair of pants having a certain pattern 684. The user may wish to refine the search to present other articles of clothing, and not pants. A selection menu 686 may provide the user with selectable elements to make sure an adjustment by providing options to add or remove certain features from the initial input. This addition or removal of features may be considered a second input 688. For example, in this case, the user has removed pants as an option and has added ties as an option, which may lead to population of the search bar to include "-pants" (to omit or remove the option) and "+tie" (to add the option). The inclusion of these terms is provided by way of non-limiting example only and may not be included in a visible area for the user. As a result, the results 690 show ties having the same pattern 684 as the initial input 682.

Figure 6F:
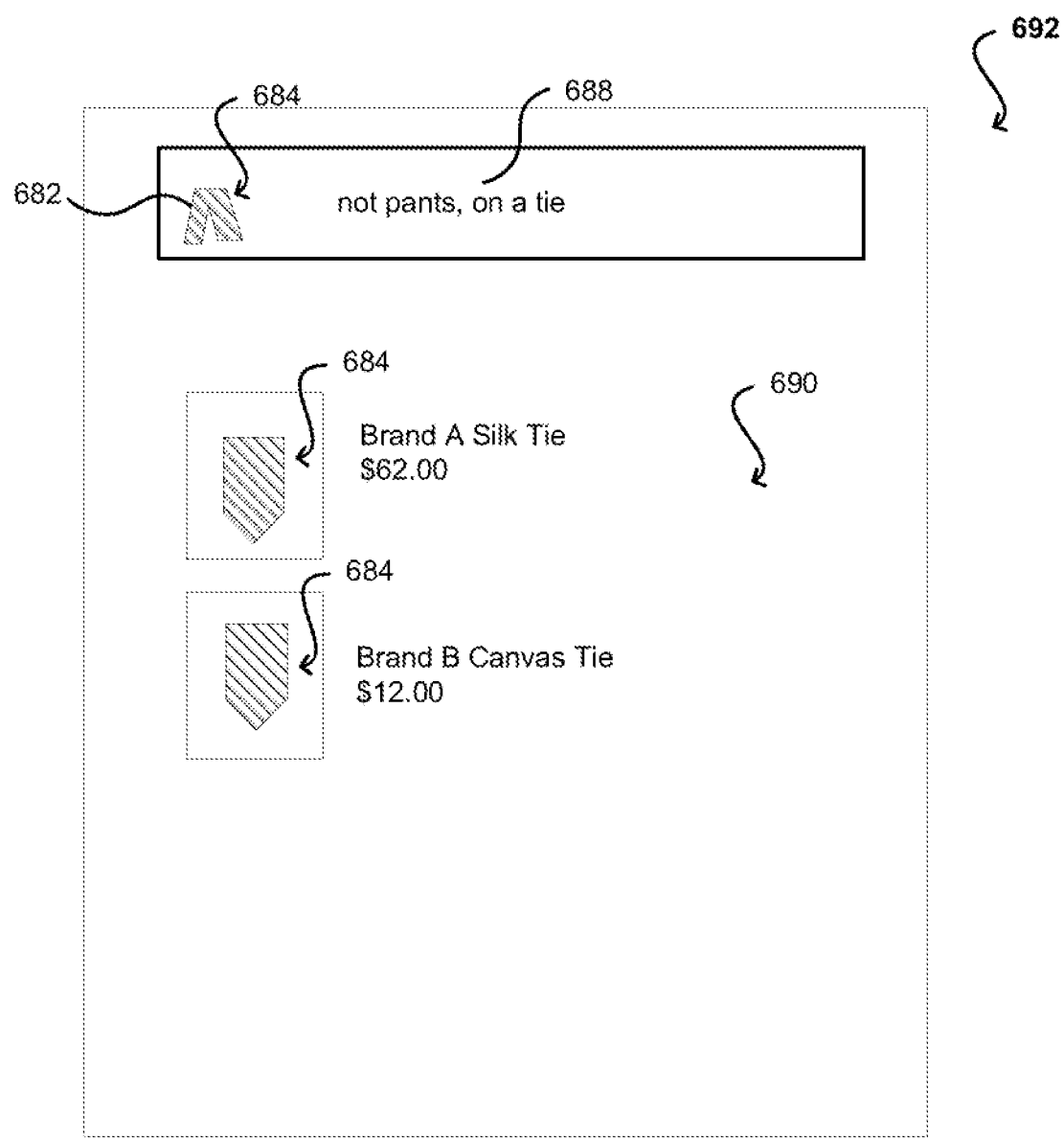
FIG. 6F illustrates an example interface of refined search result in accordance with various embodiments.
Figure 7:
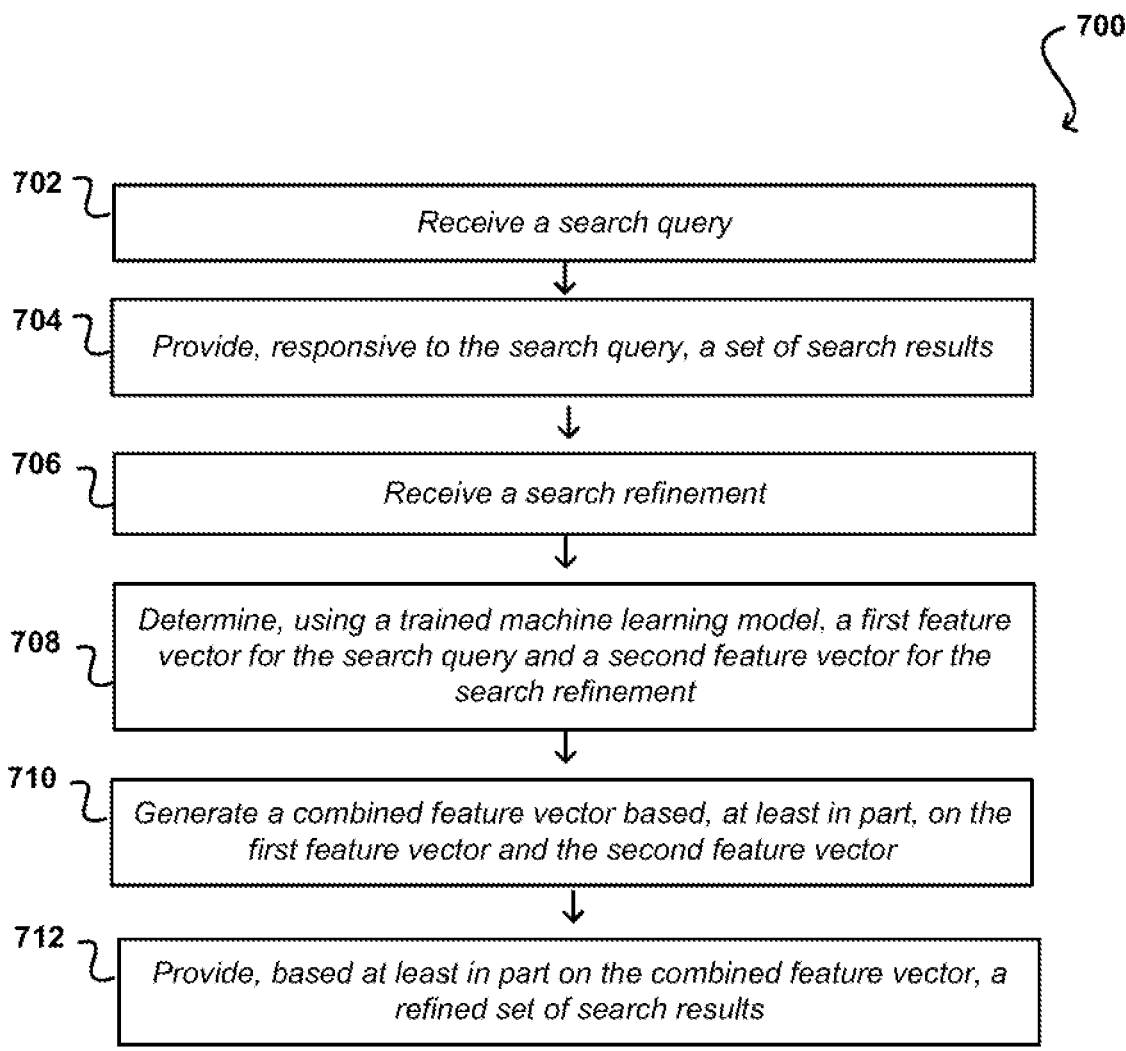
FIG. 7 illustrates an example process for generating a set of refined search in accordance with various embodiments.

FIG. 6F illustrates an example environment 692 in which the initial input 682 is provided as an image, in this case a picture of a pair of pants having the pattern 684. The user may wish to refine the search to present other articles of clothing, and not pants. In certain embodiments, the user may provide guidance for the search refinement as a natural language input, such as by typing in text or providing an auditory input, among other options. In this example, the user has provided the second input 688 of "not pants, on a tie." As noted, the user could type or speak this option, which could then be processed by the search system. The inclusion of the phrase "not pants" may provide a negative weight to items that are pants or may serve as an additional search string, such as "-pants," as shown in FIG. 6G. Additionally, the inclusion of the phrase "on a tie" may provide a positive weight to items that are ties or may serve as an additional search string, such as "+tie" or "tie" or "ties with this pattern," among other options. The results 690 show ties having the same pattern 684 as the initial input 682. FIG. 7 illustrates an example process 700 for refining a set of search results using a combined feature vector in accordance with one embodiment. It should be understood for this and other processes discussed herein that there can be additional, alternative, or fewer steps performed in similar or alternative orders, or in parallel, within the scope of the various embodiments unless otherwise stated. In this example, a search query is received 702. The search query may include an input provided by a user, where the input is of a particular modality, such as an image input, a text input, an auditory input, a video input, or a combination thereof. In various embodiments, the input may be received within an e-commerce environment where a search bar is provided to prompt the user to search for one or more products. A set of search results may be provided responsive to the search query 704. The search results may include results that are relevant based on one or more search functions and may include, at least in part, evaluation of the search query, conversion of the search query into one or more vectors, and then evaluation of the one or more vectors against an index.

The user may receive the set of search results for evaluation and determine that the result are insufficient or could include more relevant information. In at least one embodiment, a search refinement is received 706. The search refinement may be an additional input to modify or otherwise change one or more aspects of the initial search query. The search refinement may be of a different modality than the initial search query. For example, if the initial search query is an image, the refinement may be text. It should be appreciated that, in various embodiments, the refinement is used to modify or otherwise improve the initial set of search results and is not intended to be an entirely new search. As a result, a trained machine learning model may be used to generate respective feature vectors for each of the initial search query and the search refinement 708. Based on these respective feature vectors, a combined feature vector may be generated 710. As noted, in at least one embodiment, the combined feature vector applies weights to the respective feature vectors in order to provide more emphasis to the more relevant of the initial search query or refinement. However, in one or more other embodiments, a trained machine learning system or other method may be used to generate the combined feature vector, which may or may not include weights. This combined feature vector may then be used to evaluate an index to provide a refined set of search results 712.

Figure 8:
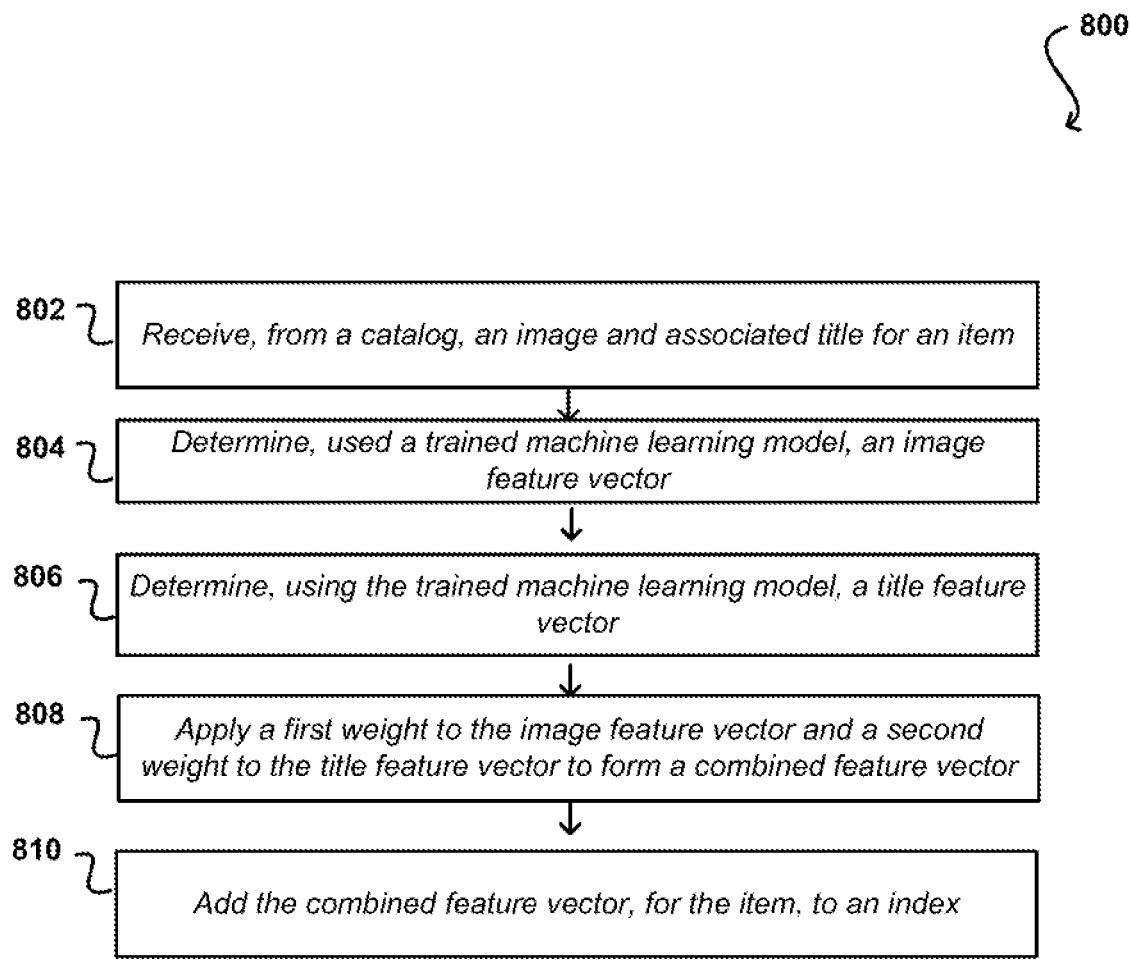
FIG. 8 illustrates an example process for generating an index in accordance with various embodiments.

FIG. 8 illustrates an example process 800 for generating an index of combined feature vectors. In this example, an image and an associated title for an image within a catalog are received 802. For example, the catalog may correspond to one or more items available for purchase, services available from a provider, or the like. The image may correspond to a catalog image (e.g., a staged image) and the title may be a textual element associated with the image in the catalog. A trained machine learning model may be used to determine an image feature vector 804 and to determine a title feature vector 806. In at least one embodiment, different models are used for the image and the text. However, in other embodiments, a common model is used. Moreover, the feature vectors may not be text and images, but may also include different modalities such as video, audio, or combinations of modalities.

A combined feature vector may be generated using the image feature vector and the title feature vector. For example, the weights may be applied to the image feature vector and the title feature vector to generate the combined feature vector 808. The weights may be adjusted based, at least in part, on one or more properties of the catalog item. For example, different categories of items may be weighted the same or may weigh the image greater than the text or the text greater than the image. The combined feature vector may then be added to an index 810 for later evaluation. Generation of the index may be performed offline prior to receipt of search queries and the index may be periodically updated based on new items added to the catalog.

Figure 9:
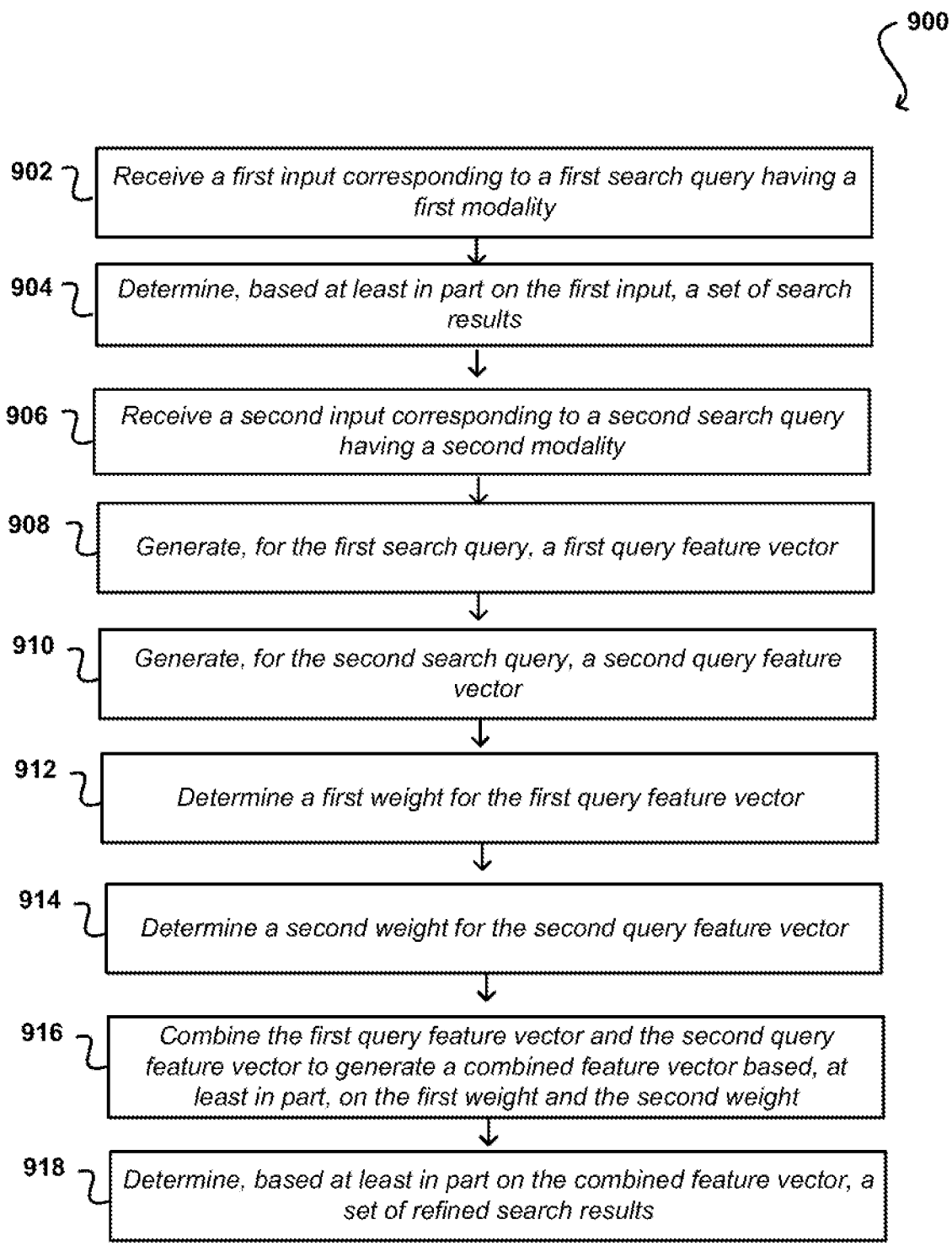
FIG. 9 illustrates an example process for generating a set of refined search in accordance with various embodiments.

FIG. 9 illustrates an example process 900 for generating a refined set of search results based on two or more input queries. In this example, a first input corresponding to a first search query is received 902. The first input may be a first modality, such as an image. The first input is used to determine a set of search results 904. For example, the first input may be processed against an index to determine one or more items using a variety of different search and retrieval techniques. A second input may then be received corresponding to a second search query 906. The second search query may have a second modality, which may be different from the first modality, and moreover may be considered a refinement or reformulation to the first input.

A trained machine learning model may be used to generate a first query feature vector 908. Additionally, the trained machine learning model may be used to generate a second query feature vector 910. The trained machine learning model may be a multimodal image model that aligns and maps different vectors for different modalities to a common embedding space, as noted above. A first weight may be determined for the first query feature vector 912 and a second weight may be determined for a second query feature vector 914. The weights may be used to generate a combined feature vector 916, where the first and second feature vectors are combined based, at least in part, on their respective weights. Weights may be a factor of a category of the search, of a user input, or the like. The combined feature vector may then be used to search an associated index to provide a set of refined search results 918.

Figure 10:
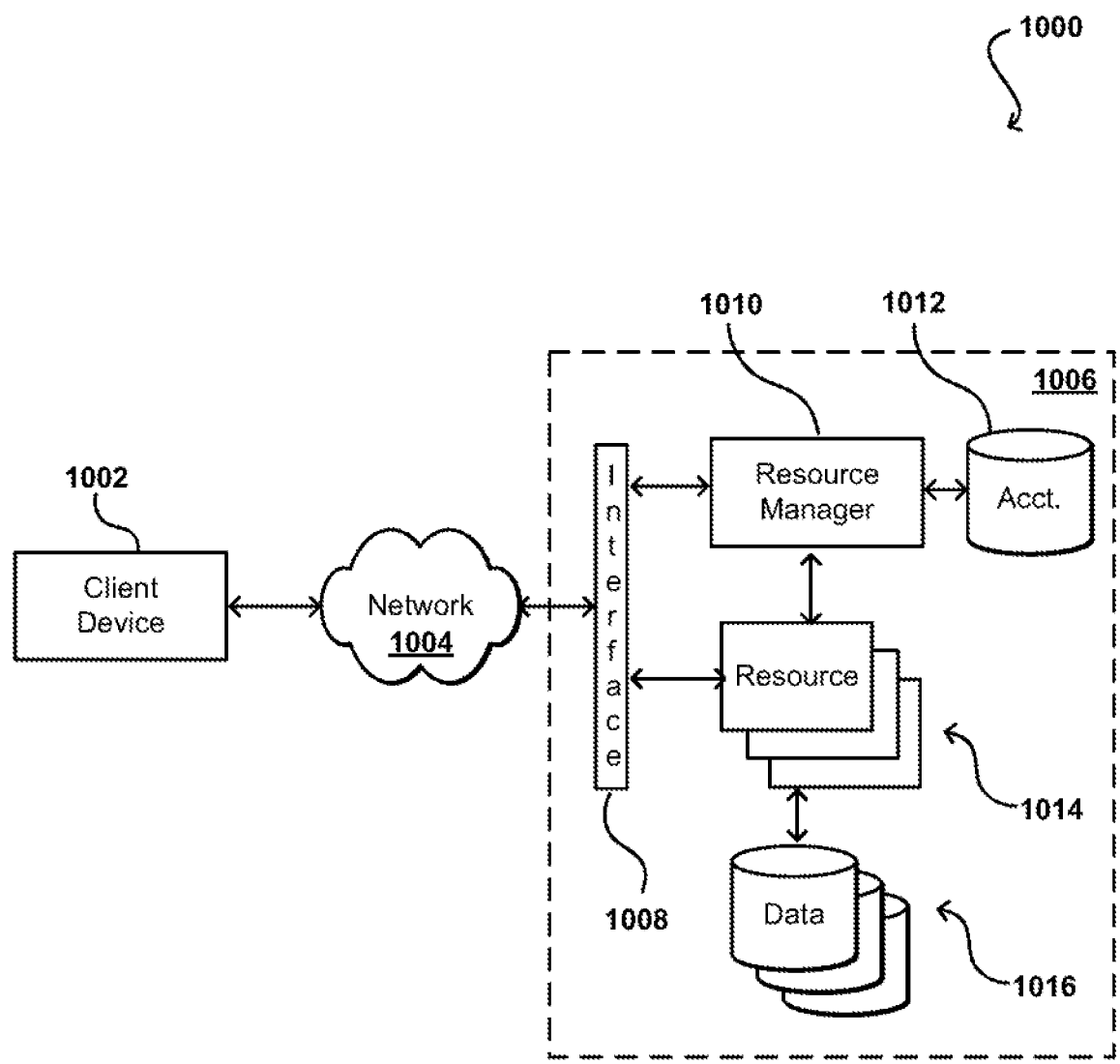
FIG. 10 illustrates an example environment in which various embodiments can be implemented.

FIG. 10 illustrates an example environment 1000 in which aspects of the various embodiments can be implemented. In this example a user is able to utilize a client device 1002 to submit requests across at least one network 1004 to a multi-tenant resource provider environment 1006. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 1004 can include any appropriate network, including an intranet, the Internet, a cellular network, a local area network (LAN), or any other such network or combination, and communication over the network can be enabled via wired and/or wireless connections. The resource provider environment 1006 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 1014 of one or more types. These types can include, for example, application servers operable to process instructions provided by a user or database servers operable to process data stored in one or more data stores 1016 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 1014 can submit a request that is received to an interface layer 1008 of the provider environment 1006. The interface layer can include application programming interfaces (APIs) or other exposed interfaces enabling a user to submit requests to the provider environment. The interface layer 1008 in this example can also include other components as well, such as at least one Web server, routing components, load balancers, and the like. When a request to provision a resource is received to the interface layer 1008, information for the request can be directed to a resource manager 1010 or other such system, service, or component configured to manage user accounts and information, resource provisioning and usage, and other such aspects. A resource manager 1010 receiving the request can perform tasks such as to authenticate an identity of the user submitting the request, as well as to determine whether that user has an existing account with the resource provider, where the account data may be stored in at least one data store 1012 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 1002 to communicate with an allocated resource without having to communicate with the resource manager 1010, at least until such time as a relevant aspect of the user account changes, the user is no longer granted access to the resource, or another such aspect changes.

The resource manager 1010 (or another such system or service) in this example can also function as a virtual layer of hardware and software components that handles control functions in addition to management actions, as may include provisioning, scaling, replication, etc. The resource manager can utilize dedicated APIs in the interface layer 1008, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 1008 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 11:
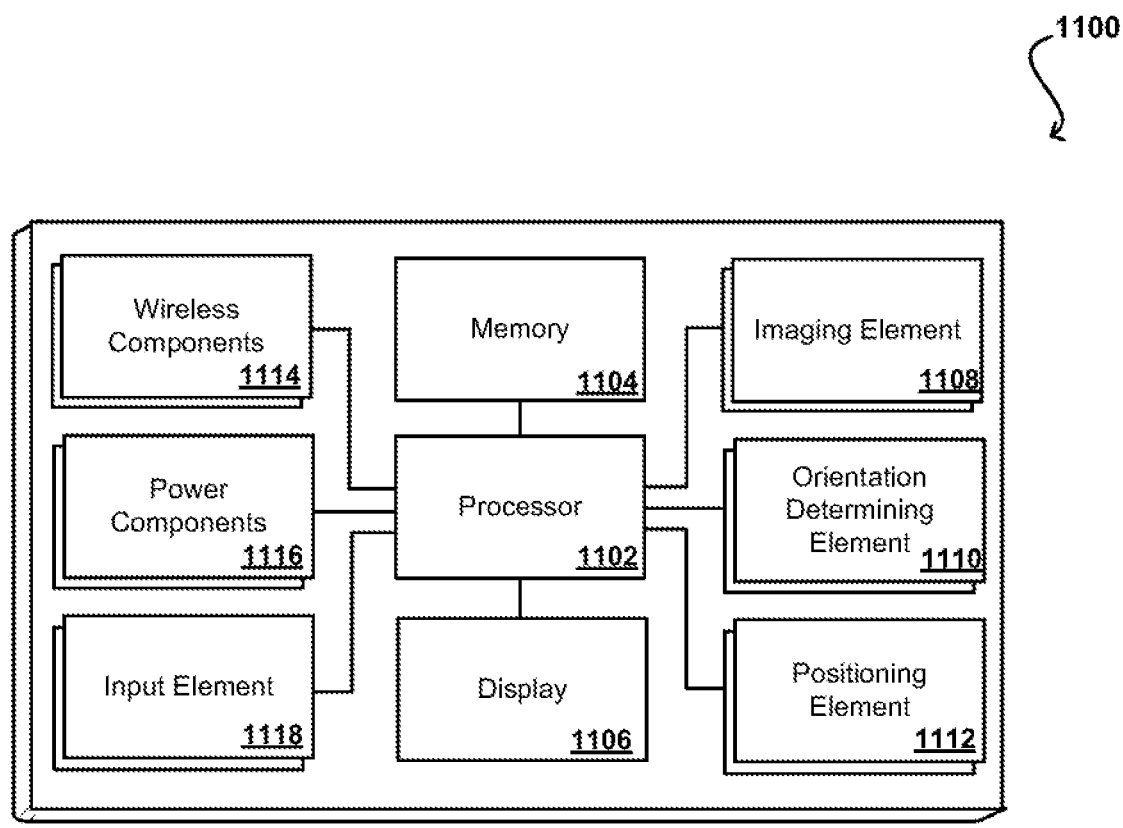
FIG. 11 illustrates example components of a computing device that can be used to implement aspects of the various embodiments.

FIG. 11 illustrates a set of basic components of an electronic computing device 1100 that can be utilized to implement aspects of the various embodiments. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices. The device typically will include some type of display screen 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving a first input corresponding to a first search query;
    determining, based at least in part on the first search query, a set of search results;
    receiving a second input corresponding to a second search query, the second search query being a refinement to the first search query;
    generating, for the first search query, a first feature vector corresponding to a representation of one or more portions of the first search query;
    generating, for the second search query, a second feature vector corresponding to a representation of one or more portions of the second search query;
    combining the first feature vector and the second feature vector to form a combined feature vector; and
    providing a set of refined search results based, at least in part, on the combined feature vector.

2. The computer-implemented method of claim 1, wherein the first input corresponds to a first modality and the second input corresponds to a second modality, the first modality being different from the second modality.

3. The computer-implemented method of claim 1, further comprising:
    determining a first weight for the first feature vector;
    determining a second weight for the second feature vector;
    applying the first weight to the first feature vector; and
    applying the second weight to the second feature vector, the first weight and the second weight modifying one or more parameters of the combined feature vector.

4. The computer-implemented method of claim 1, further comprising:
    training a multimodal image match (MIM) model to align one or more properties of a catalog image, an input image, and text within a shared space.

5. The computer-implemented method of claim 4, wherein combining the first feature vector and the second feature vector is based, at least in part, on a trained vector generation model.

6. A computer-implemented method, comprising:
    receiving a search refinement responsive to a set of search results, the set of search results based on an initial search query;
    generating, using a trained machine learning model, a first feature vector corresponding to the initial search query;
    generating, using the trained machine learning model, a second feature vector corresponding to the search refinement;
    applying a first weight to the first feature vector;
    applying a second weight to the second feature vector; and
    generating a combined feature vector based, at least in part, on the weighted first feature vector and the weighted second feature vector.

7. The computer-implemented method of claim 6, further comprising:
    receiving, from the user, an input corresponding to at least one of the first weight or the second weight.

8. The computer-implemented method of claim 6, further comprising:
    determining a category of the initial search query; and
    selecting, based at least in part on the category, at least one of the first weight and the second weight.

9. The computer-implemented method of claim 6, further comprising:
    providing a feature selection element corresponding to one or more features of an item associated with the initial search query;
    receiving a refinement input, corresponding to the search refinement, the refinement input indicative of a selection to remove a selected feature of the one or more features; and
    providing, responsive to the refinement input, a refined set of search results.

10. The computer-implemented method of claim 6, further comprising:
    receiving identifying information for an item within a catalog, the identifying information corresponding to an image and text associated with the item;
    generating an image feature vector for the item;
    generating a text feature vector for the item;
    applying an equal weighting to the image feature vector and the text feature vector;
    generating a combined item feature vector, the combined item feature vector mapping the image feature vector and the text feature vector within a common embedding space; and
    storing the combined item feature vector in an index.

11. The computer-implemented method of claim 10, further comprising:
    retrieving the index;
    evaluating the combined feature vector against the index; and
    providing a set of search results based, at least in part, on the combined feature vector.

12. The computer-implemented method of claim 6, wherein the initial search query corresponds to a first modality and the search refinement corresponds to a second modality, the first modality being different from the second modality.

13. The computer-implemented method of claim 12, wherein at least one of the first modality or the second modality includes an image input, a textual input, an auditory input, or a video input.

14. The computer-implemented method of claim 6, further comprising:
    providing one or more recommendations for the search refinement; and
    receiving a selection, from a user, corresponding to the search refinement.

15. A system, comprising:
    at least one processor; and
    memory including instructions that, when executed by the at least one processor, cause the system to:
        receive a search refinement responsive to a set of search results, the set of search results based on an initial search query;
        generate, using a trained machine learning model, a first feature vector corresponding to the initial search query;

generate, using the trained machine learning model, a second feature vector corresponding to the search refinement;

apply a first weight to the first feature vector;

apply a second weight to the second feature vector; and generate a combined feature vector based, at least in part, on the weighted first feature vector and the weighted second feature vector.

16. The system of claim 15, wherein the instructions when executed further cause the system to:

receive, from the user, an input corresponding to at least one of the first weight or the second weight.

17. The system of claim 15, wherein the instructions when executed further cause the system to:

provide a feature selection element corresponding to one or more features of an item associated with the initial search query;

receive a refinement input, corresponding to the search refinement, the refinement input indicative of a selection to remove a selected feature of the one or more features; and provide, responsive to the refinement input, a refined set of search results.

18. The system of claim 15, wherein the instructions when executed further cause the system to:

receive identifying information for an item within a catalog, the identifying information corresponding to an image and text associated with the item;

generate an image feature vector for the item;

generate a text feature vector for the item;

apply an equal weighting to the image feature vector and the text feature vector;

generate a combined item feature vector, the combined item feature vector mapping the image feature vector and the text feature vector within a common embedding space; and store the combined item feature vector in an index.

19. The system of claim 18, wherein the instructions when executed further cause the system to:

retrieve the index; and evaluate the combined feature vector against the index; and provide a set of search results based, at least in part, on the combined feature vector.

20. The system of claim 15, wherein the initial search query corresponds to a first modality and the search refinement corresponds to a second modality, the first modality being different from the second modality.

* * * * *